Figure 1:
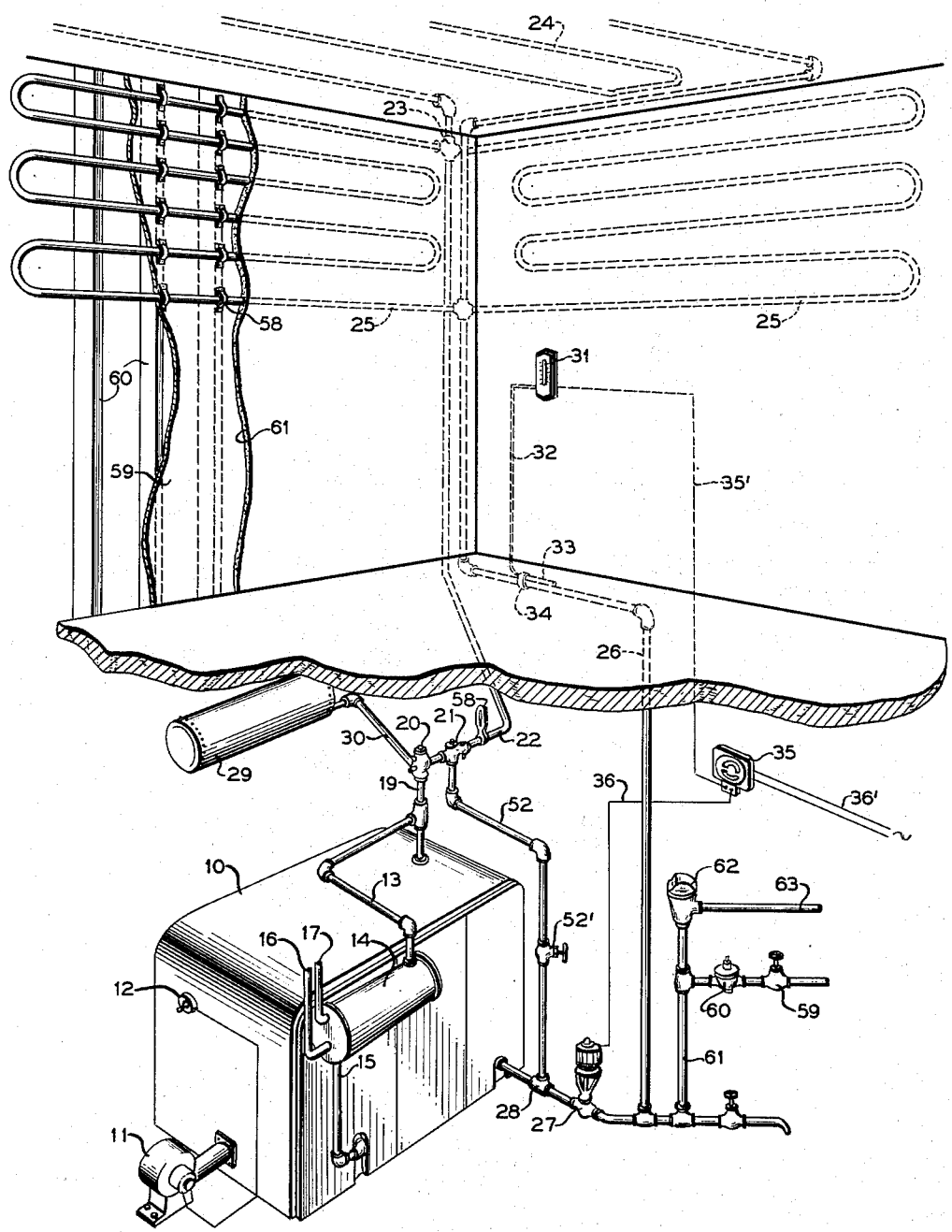

Aug. 29, 1950 — H. A. THRUSH — 2,520,446
THERMOSTATIC MIXING VALVE
Filed Aug. 16, 1946 — 2 Sheets-Sheet 1

INVENTOR.
H. A. THRUSH
BY
ATTORNEY

Aug. 29, 1950         H. A. THRUSH         2,520,446
                  THERMOSTATIC MIXING VALVE
Filed Aug. 16, 1946                      2 Sheets-Sheet 2

INVENTOR.
H. A. THRUSH
BY
*H. Yates Dowell*
ATTORNEY

Patented Aug. 29, 1950

2,520,446

UNITED STATES PATENT OFFICE 2,520,446

THERMOSTATIC MIXING VALVE

Homer A. Thrush, Peru, Ind., assignor to H. A. Thrush & Company, Peru, Ind.

Application August 16, 1946, Serial No. 691,095

3 Claims. (Cl. 236—12)

1

This invention relates to heating and cooling and more particularly to the heating of homes or other habitable quarters for human occupancy.

Various and sundry methods have been employed for obtaining and maintaining the desired conditions of temperature and humidity for human comfort with varying degrees of success but without complete satisfaction having yet been attained.

Accordingly, it is an object of the invention to provide a heating system of improved and more satisfactory character including the provision and maintenance of more uniform conditions and a system for maintaining hot water for domestic purposes.

A further object of the invention is to provide a heating system for year round operation for heating living quarters and water for domestic purposes when heating is required for maintaining living quarters at a comfortable temperature and for heating only the hot water for domestic purposes when no heat is required in the living quarters, such heating system having the necessary supply of hot water for immediate flow and consequent transfer of heat to the radiators if the same is desirable on account of a change in temperature.

The invention contemplates hot water heating systems employing a boiler for heating water or other heat transfer medium for circulation by means of a pump or circulator. The operation of the circulator is controlled by a differential thermostat responsive to changes in temperature of the space to be heated and also to changes in temperature of the water leaving the heating coils or radiators. Convection circulation between the boiler and the radiating coils is prevented by means of a gravity actuated valve which is unseated by fluid forced through the system by means of the pump or circulator. Heat in the boiler is controlled by an aquastat which maintains the water at a desired temperature of, for example, 180° F. so that when it is desirable to supply heat to the radiating coils this 180° water is instantly available. Also, water for domestic purposes is heated from the boiler.

The invention further contemplates a heating system in which the maintenance of proper temperature is less perceptible to the human senses, particularly feeling and sight, such system including radiant heating or the employment of relatively small heating coils in the vicinity of the ceiling and if desired along at least a portion of the side walls of the space to be heated,

2 such coils in which the heating medium is circulated for the necessary heating effect being adapted to be embedded in the ceiling and walls if the same is desired, thus avoiding the use of unsightly, cumbersome radiators or the like.

The invention further contemplates control means for preventing the flow of water of excessive temperature through the small coils, thus avoiding damage to the walls in which said coils are embedded. Such control means comprises a flow mixing valve utilized to maintain a predetermined water temperature flowing to the heating or radiating coils. This flow mixing valve operates to cause relatively cool water returning from the heating or radiating coils to mix with hot water from the boiler in the proper proportions so that only water of moderate temperature reaches the radiating coils.

Figure 2:
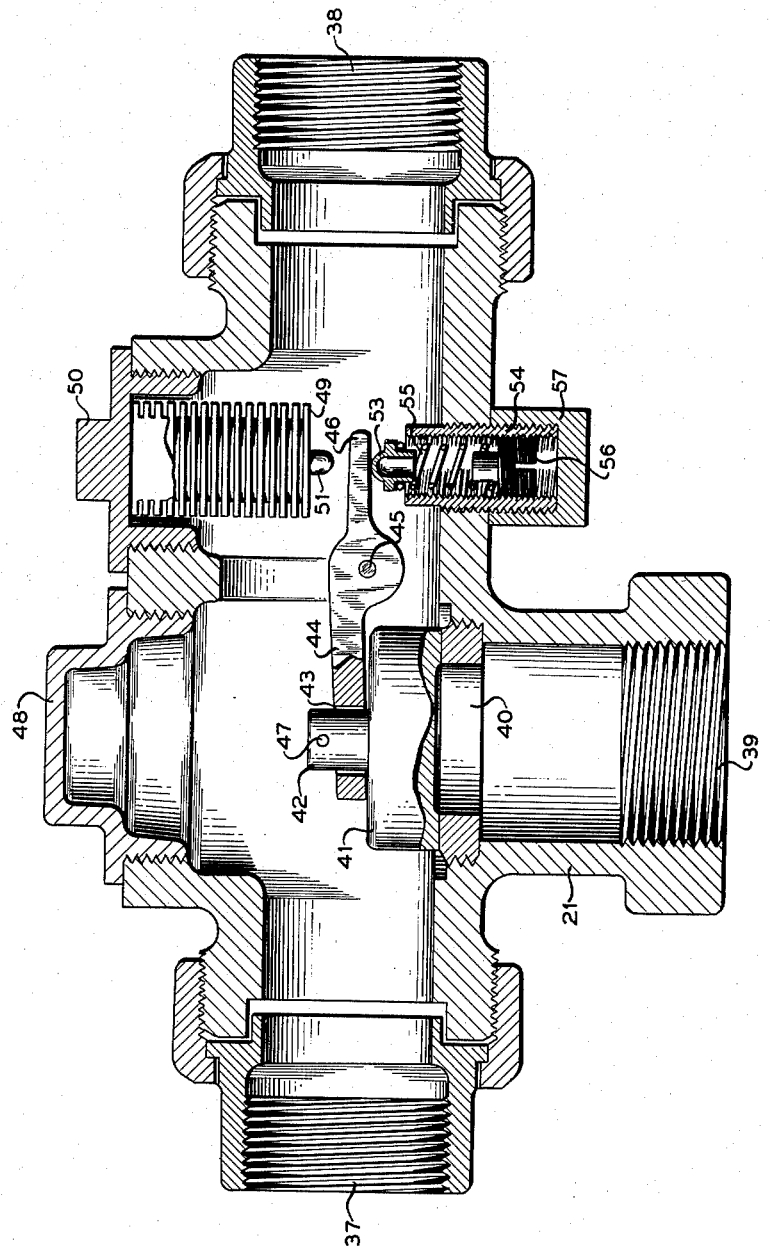

Further objects and advantages of the invention will be apparent from the following specification taken in conjunction with the accompanying drawings, wherein:

Fig. 1 is a diagrammatic view illustrating one application of the invention; and Fig. 2, a thermostatic mixing valve used in the system of Fig. 1.

Referring to the drawings, the heating system of the present invention includes a hot water boiler 10 to which heat is supplied in any desired manner, as for example, by means of a burner 11 adapted to consume oil or gas and subject to an aquastat or other control 12 adapted to be applied to the upper portion of the boiler so that water therein is maintained at the desired temperature, as for example 180° F. The hot water within the boiler is adapted to flow through pipe 13, through domestic water heater 14 and be returned to the boiler through return line 15 whereby water for domestic purposes is heated by circulation from a storage tank, not shown, through pipes 16 and 17.

Hot water from the boiler may flow through pipe 19, valves 20 and 21, and pipe 22 to a distributing valve 23 and thence through heating or radiating coils 24 in the ceiling and heating or radiating coils 25 in the side walls of the room to be heated, and finally through a return line 26, circulator 27, and by-pass connection 28 back into the boiler for reheating.

Convection circulation between the boiler 10 and the radiating coils 24 and 25 is prevented by the gravity operated valve 20 disclosed in my Patent No. Re. 19,873. This valve is similar to the valve 21 with the exception that the valve 21 also includes thermostatic means for automatically opening the gravity operated valve, as will be later described.

In order to prevent entrapment of air in the line 19 from opening the valve 20, an expansion tank 29 is provided which communicates with line 19 immediately below the valve 20 through line 30 whereby expansion of gases will be accommodated by the tank 29.

In order to properly control the radiant heating system there is provided at an appropriate location on the wall of the room or space to be heated a differential thermostat 31 which is responsive to temperature changes in the room and also to temperature changes in the water flowing from the heating coils 24 and 25 through the return line 26. For the latter function the thermostat 31 is provided with a capillary tube 32, terminating in a temperature responsive bulb 33 clamped to the return line 26 at 34.

Mounted at a location convenient to the circulator 27 is a combined transformer and relay 35 connected to the thermostat 31 by a two-wire cable 35' and with a circulator 27 by a two-wire cable 36. Electric power for operation of the relay and circulator 27 is obtained from a power line 36' connected to the combination transformer relay 35.

The differential thermostat 31 operates to control the temperature in the room or space to be heated and also to hold the water in the circulating coils at a uniform temperature just sufficient to maintain the desired room temperature. The thermostat 31 acts as a switch to control the operation of the relay 35 which in turn completes or breaks the circuit to the circulator 27, thus controlling the operation thereof.

When the thermostat 31 is actuated in response to a drop in temperature either in the room or in the water in the return line 26 the power circuit to the circulator is closed and the circulator operates to force water through the boiler out the pipe 19 through the valves 20 and 21 and pipe 22 to the heating coils from which it is returned through the pipe 26 to the circulator. When the boiler temperature is relatively high, for example 180° F., it may not be desirable for 180° water to pass to the heating coils. Accordingly, the valve 21 as shown in Fig. 2 is employed. This valve 21 is provided with a removable seat 40 and a valve body 41 provided with a stem 42 fitted loosely in an opening 43 of a lever 44 mounted on a pivot 45 and having an extension 46. The stem 42 is held within the opening 43 of lever 44 by means of a pin 47; thus rocking of the lever 44 on its pivot 45 will serve to seat and unseat the valve. The valve 21 is provided with an inlet 37 and an outlet 38 and also a passage 39 in the inner end of which is located the valve seat 40. The valve 21 is provided with a removable plug 48 which affords access to the working parts just described. The plug 48 and the valve body into which it fits provides a substantially dome or bell shaped mixing chamber opposite the inlet 39. The passage 39 and valve member 41 are provided in order to admit water into the valve body for mixing with water entering through the inlet 37 so that water passing out of the valve through the exit 38 will have the desired temperature. For controlling the valve body 41, an accordion type bellows 49 is provided and this bellows, carried by means of a removable plug 50, has a tip 51 for engagement with the extension 46 of the valve operating lever 44. The shape of the portion of the valve body in which the bellows 49 is positioned provides for a dome or bell shaped recess of smaller dimension than that of the mixing chamber and spaced therefrom by a common wall member. By providing a recess for the bellows 49, substantial contact between the water passing through the valve body and the bellows is assured. Thus, when the hot water comes in contact with the bellows, it causes expansion of the same and the tip 51 moves downwardly proportionately. When the temperature of the bellows is beyond the setting, for example 140°, the tip 51 will engage the arm 46 depressing it, raising the valve body 41 from its seat and permitting cooler water being returned to the boiler from the radiators to flow through the pipe 52 from the by-pass connection 28. Thus, by-passed water and boiler water being mixed will have a lower temperature and will not injure the heating coils. In order to further control the by-pass or shut it off entirely there is provided in the by-pass 52 a valve 52' which may be manipulated as desired.

In order to maintain the valve body 41 against its seat, there is provided a seating tip 53 slidably mounted in a sleeve 54. Received within the sleeve for biasing the tip 53 is a spring 55 and a spring tension adjusting plug 56. To prevent tampering the adjusting plug is covered by a cap 57 threadedly received on the sleeve 54. This spring mechanism is of the desired strength to maintain the valve seated but to yield to the operation of the bellows 49. Accordingly, it will be understood that a heating system is provided employing radiant heating by small coils embedded in wall structure, through which coils water from a boiler is forcibly circulated by means of a pump or circulator. The operation of this circulator is dependent upon the temperature at the exit ends of the coils and of the air in the space to be heated while the temperature of the water supplied to the coils is controlled by means of the by-passing of water from the return line to mix with the water supplied from the boiler so that only water of moderate predetermined temperature is permitted to flow through the radiating coils.

In order to properly adjust the valve 21 and also to serve as a constant visual check on the operation of the valve there is provided in the pipe 22 a thermometer 58 which will indicate the temperature of water passing to the heating coils.

The system and boiler are supplied with water from a main 59, pressure reducing valve 60 and pipe 61. A pressure relief valve 62 and overflow pipe 63 are also provided to prevent excessive pressures in the system.

The heating coils 24 and 25 may be supported in any desired manner, as for example, by means of brackets or clips 58 attached to sheet 59 mounted on stud 60 and over these coils and brackets the finishing or surface layer 61 is applied.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A thermostatic mixing valve comprising a valve body having an axial passage therethrough, a hot water inlet at one end of said passage, an outlet at the other end of said passage, a cool water inlet to said passage at right angles thereto, a valve seat in said cool water inlet, a valve member operatively associated with said valve seat, a lever pivotally mounted in said passageway between said cool water inlet and said outlet, means mounting said valve member on one end of said lever, a thermostatic element threadedly received in an opening in said body, means on said thermostatic element operatively engaging the other end of said lever, said thermostatic element being adapted to expand in response to a rise in temperature and to contract in response to a drop in temperature, a spring-pressed element engaging said other end of said lever in opposition to said thermostat, said spring-pressed element holding said valve member in a normally closed position, said thermostatic element acting when expanded in response to a rise in temperature to rock said lever about its pivot thus opening said valve in accordance with the degree of the rise in temperature of the water flowing through said passageway whereby water from said cool water inlet is admitted to said passageway mixing with the hot water and providing water at the outlet below a predetermined maximum temperature, and a screw threaded plug received in a bore in said body at right angles to said passageway and opposite said cool water inlet and said valve member to facilitate repairs.

2. A thermostatic mixing valve comprising a body having a hot water inlet connection, an inlet connection for relatively cool water from a by-pass line and an outlet connection, a removable valve seat adjacent said cool water inlet, a lever pivotally mounted adjacent said valve seat, a valve member mounted on said lever adjacent one end thereof for movement toward and away from said valve seat and acting when seated to close said cool water inlet, an extension on the opposite end of said lever, a thermostatic element removably mounted in said body in the path of movement of water from the two inlets to said outlet, means on said thermostatic element operatively engaging said extension upon expansion of said thermostatic element in response to a temperature rise in the water to move said valve away from said seat thus opening said cool water inlet, a spring-pressed plunger operatively engaging said extension in opposition to said thermostatic element, screw threaded means for adjusting the pressure on said spring-pressed plunger, said spring-pressed plunger operating to move said valve member toward said seat and to control the operation of said thermostatic element whereby fluid from said cool water inlet is mixed with water from said hot water inlet to provide water emerging from said outlet having a temperature below a predetermined maximum limit.

3. A thermostatic mixing valve comprising an elongated body having a hot water inlet at one end, a cool water inlet at the side, and an outlet at the other end, a valve member movably mounted in said body for closing said cool water inlet, said valve body having a relatively large dome shaped mixing chamber opposite said cool water inlet and a relatively small dome shaped recess between said mixing chamber and said outlet, thermostatic means mounted in said recess for opening said valve member, said mixing chamber and said recess being separated by a common wall member, a plug mounted in said body opposite said valve member and comprising a portion of the valve body defining said mixing chamber and a spring member mounted in said body in opposition to said thermostatic means to close said valve member.

HOMER A. THRUSH.

REFERENCES CITED

The following references are of record in the file of this patent:

UNITED STATES PATENTS

| Number | Name | Date |
|---|---|---|
| 854,450 | Bartlett | May 21, 1907 |
| 1,137,921 | Snediker | May 4, 1915 |
| 1,145,476 | Fulton | July 6, 1915 |
| 1,934,499 | Hall | Nov. 7, 1933 |
| 2,216,346 | Hedmark | Oct. 1, 1940 |
| 2,262,194 | Newton | Nov. 11, 1941 |
| 2,326,096 | Dillman | Aug. 3, 1943 |

FOREIGN PATENTS

| Number | Country | Date |
|---|---|---|
| 522,577 | Great Britain | June 21, 1940 |
| 773,505 | France | Sept. 3, 1934 |